United States Patent
Wu et al.

(10) Patent No.: US 9,755,797 B2
(45) Date of Patent: Sep. 5, 2017

(54) LOCALIZATION-BASED BEAMFORMING SCHEME FOR SYSTEMS WITH MULTIPLE ANTENNAS

(71) Applicant: MEDIATEK Singapore Pte. Ltd., Singapore (SG)

(72) Inventors: Wen-Rong Wu, Hsinchu (TW); Yun-Kai Wang, Taichung (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 211 days.

(21) Appl. No.: 14/580,224

(22) Filed: Dec. 23, 2014

(65) Prior Publication Data

US 2015/0188678 A1 Jul. 2, 2015

Related U.S. Application Data

(60) Provisional application No. 61/920,833, filed on Dec. 26, 2013.

(51) Int. Cl.
*H04B 7/06* (2006.01)
*G01S 5/00* (2006.01)
(Continued)

(52) U.S. Cl.
CPC ............. *H04L 5/0023* (2013.01); *G01S 1/14* (2013.01); *G01S 5/0027* (2013.01);
(Continued)

(58) Field of Classification Search
CPC ..... H04B 7/0617; H04B 7/063; H04W 16/28; H04W 64/006; G01S 5/0027; G01S 5/0036

See application file for complete search history.

(56) References Cited

U.S. PATENT DOCUMENTS

2002/0196187 A1 12/2002 Holt .............................. 342/453
2003/0117320 A1 6/2003 Kim et al. .................... 342/457
(Continued)

FOREIGN PATENT DOCUMENTS

| CN | 102832985 A | 12/2012 |
|---|---|---|
| CN | 103298098 A | 9/2013 |
| WO | wo2013125993 A1 | 2/2012 |

OTHER PUBLICATIONS

International Search Report and Written Opinion of International Search Authority for PCT/CN2014/095151 dated Mar. 27, 2015(11 pages).

(Continued)

*Primary Examiner* — Hoon J Chung
(74) *Attorney, Agent, or Firm* — Imperium Patent Works; Zheng Jin

(57) ABSTRACT

A method of accurate 3D positioning with reduced cost is proposed. A user equipment (UE) receives a plurality of positioning reference signals (PRSs) from a plurality of base stations. The plurality of base stations includes a serving base station and two neighboring base stations. The UE estimates a plurality of line-of-sight (LOS) paths and corresponding indexes of the PRSs for time of arrival (TOA) and time difference of arrival (TDOA) measurements. The UE then estimates an elevation angle of the UE based on the estimated LOS paths of the PRS from the serving base station. Finally, the system (either UE or network, depending on where the coordinates are) can calculate the UE position based on the TDOA measurements and the elevation angle.

16 Claims, 6 Drawing Sheets

(51) Int. Cl.
- H04L 5/00 (2006.01)
- H04W 64/00 (2009.01)
- H04W 16/28 (2009.01)
- G01S 5/10 (2006.01)
- G01S 5/12 (2006.01)
- G01S 1/14 (2006.01)
- H04W 88/02 (2009.01)

(52) U.S. Cl.
CPC .............. *G01S 5/0036* (2013.01); *G01S 5/10* (2013.01); *G01S 5/12* (2013.01); *H04B 7/0617* (2013.01); *H04W 16/28* (2013.01); *H04W 64/006* (2013.01); *H04W 88/02* (2013.01)

(56) References Cited

U.S. PATENT DOCUMENTS

| | | | | |
|---|---|---|---|---|
| 2008/0204322 | A1 | 8/2008 | Oswald et al. | 342/465 |
| 2013/0029685 | A1* | 1/2013 | Moshfeghi | G01S 19/48 455/456.1 |
| 2014/0162704 | A1* | 6/2014 | Choi | G01S 1/08 455/456.6 |
| 2015/0230112 | A1* | 8/2015 | Siomina | G01S 5/0205 370/252 |

OTHER PUBLICATIONS

Channel Estimation for OFDM Systems with Subspace Persuit Algorithm; Wen-Rong Wu et al.; Institute of Communication Engineering National Chiao-Tung University, Hsinchu Taiwan (4 pages).
Dilution of Precision; Richard B. Langley; University of New Brunswick (5 pages).
Enhanced LTE TOA/OTDOA Estimation with First Arriving Path Detection; Ming Huang et al.; 2013 IEEE Wireless Communications and Networking Conference (WCNC):PHY (6 pages).
Enhanced RSTD for Scalable Bandwidth of OTDOA Positioning in 3GPP LTE; Jinnan Liu et al.; HiSilicon Research Department Beijing Institute et al.; (5 pages).
A Simple and Efficient Estimator for Hyperbolic Location; Chan et al.; 1994 IEEE (11 pages).
FCC Wireless 911 Requirements; WTB/Policy; Jan. 2001 (4 pages).
Joint Channel and Time Delay Estimation for LTE Positioning Reference Signals; Peral-Rosado et al. (8 pages).
Location-Aware Communications for 5G Networks; Taranto et al.; IEEE Signal Processing Magazine [103] Nov. 2014 (11 pages).
Location Based Beamforming; Maiberger et al.; 2010 IEEE 26th Convention of Electrical and Electronics Engineers in Israel (4 pages).
Overview of Radiolocation in CDMA Cellular Systems; Caffery et al.; Georgia Institute of Technology (8 pages).
Performance Analysis of PRS-Based Synchronization Algorithms for LTE Positioning Applications; Panchetti et al. (6 pages).
Position-Location Solutions by Taylor-Series Estimation; Foy et al.; Stanford Research Institute (8 pages).
Positioning GSM Telephones; Drane et al.; Computer Systems Engineering University of Technology, Sydney (10 pages).
Positioning in LTE; Kangas et al.; WCDMA RAN System Management et al. Stockholm Sweden (47 pages).
Preliminary Results on 3D Channel Modeling: From Theory to Standardization; Kammoun et al.; IEEE Journal on Selected areas in Communications, vol. 32, No. 6, Jun. 2014 (11 pages).
R4-093400 3GPP TSG-RAN WG4 Meeting #52; OTDOA Positioning Studies in RAN4: Updated Proposal on System Simulation Assumptions; Ericsson, ST-Ericsson, Qualcomm; Shenzhen, China dated Aug. 24-28, 2009 (5 pages).
3GPP TR 25.966 V12.0.0 (Sep. 2014); 3rd generation Partnership Project; Technical Specification Group Radio Access Network; spatial Channel Model for Multiple Input Multiple Output (MIMO) Simulations (Release 12) (40 pages).
EPO, Search Report for the EP patent application 14873402.3 dated Sep. 9, 2016 (7 pages).

* cited by examiner $$\mathbf{f}(\theta) = \begin{bmatrix} \sqrt{(1+\tan^2(\alpha))\left((x-x_1)^2+(y-y_1)^2\right)} - \sqrt{(x-x_2)^2+(y-y_2)^2+(z_1-z_2+\tan(\alpha)\sqrt{(x-x_1)^2+(y-y_1)^2})^2} \\ \sqrt{(1+\tan^2(\alpha))\left((x-x_1)^2+(y-y_1)^2\right)} - \sqrt{(x-x_3)^2+(y-y_3)^2+(z_1-z_3+\tan(\alpha)\sqrt{(x-x_1)^2+(y-y_1)^2})^2} \end{bmatrix} = \begin{bmatrix} d_1-d_2 \\ d_1-d_3 \end{bmatrix}$$

$$\mathbf{f} = \begin{bmatrix} \mathbf{f}_1 \\ \mathbf{f}_2 \end{bmatrix}, \mathbf{J} = \begin{bmatrix} \frac{\partial \mathbf{f}_1}{\partial x} & \frac{\partial \mathbf{f}_1}{\partial y} \\ \frac{\partial \mathbf{f}_2}{\partial x} & \frac{\partial \mathbf{f}_2}{\partial y} \end{bmatrix} =$$

$$\begin{bmatrix} \tan^2(\alpha)(x-x_1)\left[\frac{1}{d_1}-\frac{1}{d_2}\right] - \frac{\tan(\alpha)(x-x_1)\frac{z_1-z_2}{\sqrt{(x-x_1)^2+(y-y_1)^2}}d_2}{d_2} & \tan^2(\alpha)(y-y_1)\left[\frac{1}{d_1}-\frac{1}{d_2}\right] - \frac{\tan(\alpha)(y-y_1)\frac{z_1-z_2}{\sqrt{(x-x_1)^2+(y-y_1)^2}}d_2}{d_2} \\ \tan^2(\alpha)(x-x_1)\left[\frac{1}{d_1}-\frac{1}{d_3}\right] - \frac{\tan(\alpha)(x-x_1)\frac{z_1-z_3}{\sqrt{(x-x_1)^2+(y-y_1)^2}}d_3}{d_3} & \tan^2(\alpha)(y-y_1)\left[\frac{1}{d_1}-\frac{1}{d_3}\right] - \frac{\tan(\alpha)(y-y_1)\frac{z_1-z_3}{\sqrt{(x-x_1)^2+(y-y_1)^2}}d_3}{d_3} \end{bmatrix}$$

$$+ \begin{bmatrix} \frac{x-x_1}{d_1} - \frac{x-x_2}{d_2} & \frac{y-y_1}{d_1} - \frac{y-y_2}{d_2} \\ \frac{x-x_1}{d_1} - \frac{x-x_3}{d_3} & \frac{y-y_1}{d_1} - \frac{y-y_3}{d_3} \end{bmatrix} = \mathbf{J}_{new} + \mathbf{J}_{old}$$

FIG. 8

LOCALIZATION-BASED BEAMFORMING SCHEME FOR SYSTEMS WITH MULTIPLE ANTENNAS

CROSS REFERENCE TO RELATED APPLICATIONS

This application claims priority under 35 U.S.C. §119 from U.S. Provisional Application No. 61/920,833, entitled "A Localization-based Beamforming Scheme for Systems with Multiple Antennas," filed on Dec. 26, 2013, the subject matter of which is incorporated herein by reference.

TECHNICAL FIELD

The disclosed embodiments relate generally to wireless mobile communication systems, and, more particularly, to 3D positioning utilizing beamforming for systems with multiple antennas.

BACKGROUND

Wireless mobile communication systems have evolved quickly in the recent few decades. After 2G and 3G systems, now the 4th generation (4G) wireless communication system has started to operate. In the 4G system, multiple-input multiple-output (MIMO) transmission technique has played an important role. By utilizing multiple antennas on transmitter and receiver, system reliability and channel capacity can be effectively enhanced. When the transmitter can obtain the chancel state information (CSI) from the feedback of the receiver, MIMO precoding scheme can be conducted. By this way, the channel capacity can be further enhanced. MIMO precoding technique has been proposed in the latest wireless communication standards, such as Worldwide Interoperability for Microwave Access (Wimax), 3GPP Long Term Evolution (LTE), and 3GPP Long Term Evolution Advanced (LTE-A).

Recently, MIMO technique with massive number of antennas (or massive MIMO) has been proposed. With a large number of antennas at the transmitter/receiver, the small-scale channel fading can be easily compensated. Even the simplest match filtering (MF) can do the job. Under this situation, the system can obtain the same performance as that in the AWGN environment even though the channel is actually fading. There are other advantages of massive MIMO. For example, much higher multiuser diversity can be obtained and temporarily shut down of a few RF equipments can be tolerable.

One way to utilize the massive number of antennas is beamforming. By beamforming, the signal to interference plus noise ratio (SINR) at the receiver side can be effectively enhanced. However, the main problem in beamforming is how to determine the beam direction. Conventional beamforming may employ a scanning scheme to obtain direction information, and it usually requires long delay time and high overhead. This problem becomes more apparent when a massive antenna array is deployed in a base station (BS). This is because the BS needs to scan the whole region of the serving area and then determine beam directions from the feedback of user equipments (UEs). It takes a lot of time for scanning and the corresponding feedback overhead from UEs is high.

A location-based beamforming scheme can be applied to overcome the problem. The idea is that if a BS knows a UE location, it knows which direction to beamform. First, the coverage area of a BS is partitioned into regions. The UE then estimate its location and report its region index to the BS. Finally, the BS conducts beamforming based on the reported information. In LTE-A systems, similar localization-based beamforming scheme can also be applied. By utilizing reference signals defined by LTE-A, UEs can employ an observed-time-difference-of-arrival (OTDOA)-based algorithm to estimate its position. The UEs then feedback the position information to their serving BSs. Based on the feedback, the BSs can calculate the beam directions and then conduct beamforming.

The existing OTDOA-based positioning algorithm has certain drawbacks. First, it needs four eNodeBs for 3D positioning. The four eNodeBs provide three range differences that represent three independent hyperbola equations to solve three parameters: the position or coordinates [x, y, z] of UE in 3D. Second, eNodeBs are typically deployed at similar height, e.g., about 25 meters above ground. However, in order to achieve good geometrical dilution of precision (GDOP), the fourth eNodeB needs to be deployed at a relative high position, which introduces additional cost.

A 3D positioning method with reduced cost and satisfactory estimation accuracy is sought.

SUMMARY

A method of accurate 3D positioning with reduced cost is proposed. A user equipment (UE) receives a plurality of positioning reference signals (PRSs) from a plurality of base stations. The plurality of base stations includes a serving base station and two neighboring base stations. The UE estimates a plurality of line-of-sight (LOS) paths and the corresponding indexes of the PRSs for time of arrival (TOA) and time difference of arrival (TDOA) measurements. The UE then estimates an elevation angle of the UE based on the estimated LOS paths from the serving base station. Finally, the UE calculates a UE position based on the TDOA measurements and the elevation angle if the UE knows the coordinates of the plurality of base stations. If the UE does not know the coordinates of the plurality of base stations, then the UE transmits the TOA/TDOA measurements and the elevation angle to the serving base station. The serving base station is then able to calculate the UE position based on the received information accordingly.

In one embodiment, the LOS path of the PRS from the serving base station is the first path of an estimated channel impulse response (CIR), applied by channel tap zeroing with a calculated threshold. The PRS transmission from the serving base station is applied with the distinct beamforming vectors for multiple OFDM symbols using multiple antennas. The UE estimates the elevation angle based on multiple LOS path measurements that correspond to the multiple OFDM symbols in one subframe.

Other embodiments and advantages are described in the detailed description below. This summary does not purport to define the invention. The invention is defined by the claims.

BRIEF DESCRIPTION OF THE DRAWINGS

FIG. 8 illustrates a modified 3D OTDOA Jacobian Matrix.

DETAILED DESCRIPTION

Reference will now be made in detail to some embodiments of the invention, examples of which are illustrated in the accompanying drawings.

Figure 1A:
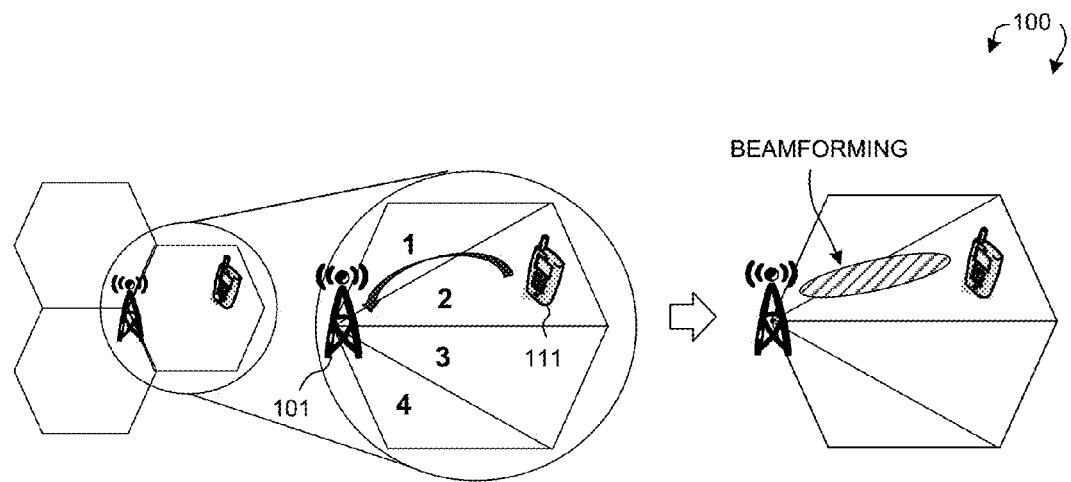
FIG. 1A illustrates a localization-based beamforming scheme in a mobile communication network in accordance with one novel aspect.

FIG. 1A illustrates a localization-based beamforming scheme in a mobile communication network 100 in accordance with one novel aspect. Mobile communication network 100 is an LTE network comprising a base station BS 101 and a user equipment UE 111. In LTE-A systems, a localization-based beamforming scheme can be applied to enhance system performance with reduced overhead. In the example of FIG. 1A, the coverage area of BS 101 is partitioned into four regions 1, 2, 3, and 4. UE 111 estimates its location and reports its region index (e.g., region #2) to BS 101. BS 101 then conducts beamforming based on the reported location information. Due to the increasing need for location-based service (LBS), location information typically comes from Global Navigation Satellite System (GNSS). However, GNSS signal condition is unstable in urban environment. Therefore, cellular system and Wi-Fi access points have been utilized to complement the coverage for seamless LBS. For example, LTE has defined reference signals allowing a UE to employ an observed-time-difference-of-arrival (OTDOA)-based algorithm to estimate its position.

Figure 1B:
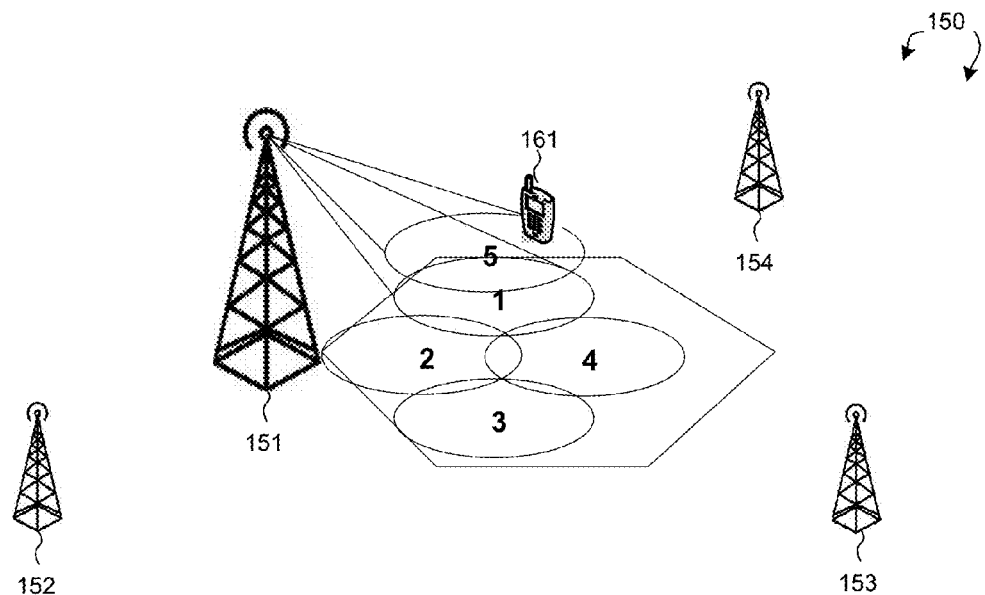
FIG. 1B illustrates a localization-based beamforming scheme in a mobile communication network in 3D scenario.

FIG. 1B illustrates a localization-based beamforming scheme in a mobile communication network 150 in 3D scenario. Mobile communication network 150 comprises BS 151 and UE 161. In the example of FIG. 1B, the position of UE 161 is partitioned to horizontal and vertical. UE 161 reports its location index to BS 151 for beamforming. The communication overhead of reporting is increased in 3D scenario. Furthermore, the UE needs four eNodeBs (e.g., BS 151 to BS 154) for 3D positioning. In order to achieve good geometrical dilution of precision (GDOP), the fourth eNodeB also needs to be deployed at a relative high position. Typically, however, eNodeBs are deployed at similar height, e.g., 25 meters. High position deployment thus introduces additional cost.

Figure 2:
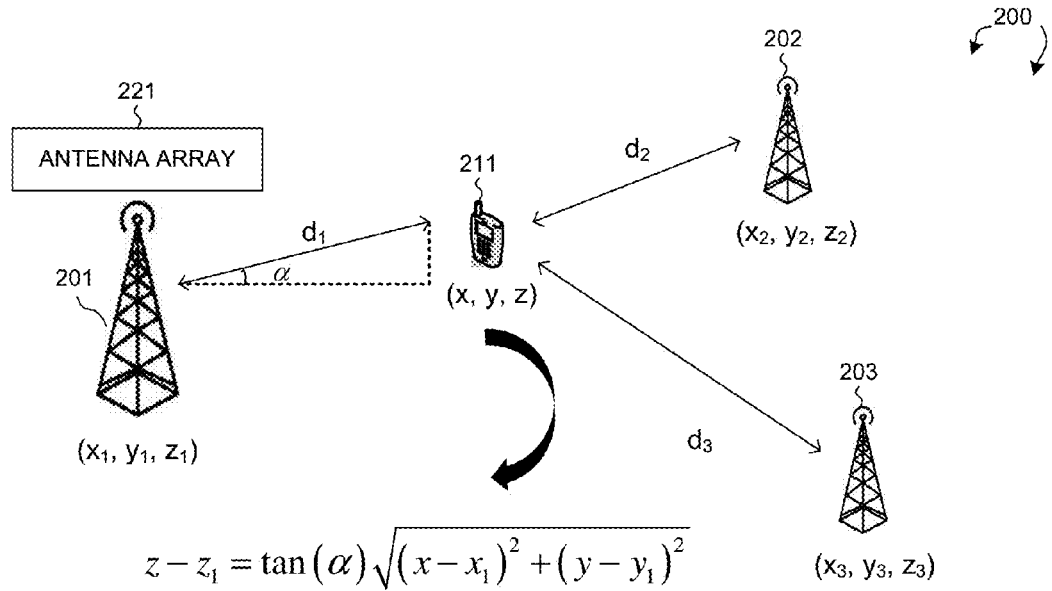
FIG. 2 illustrates a 3D OTDOA-based positioning scheme utilizing TX beamforming in a mobile communication network in accordance with one novel aspect.

FIG. 2 illustrates a 3D OTDOA-based positioning scheme utilizing TX beamforming with multiple antennas in a mobile communication network 200 in accordance with one novel aspect. Mobile communication network 200 comprises a serving eNB 201, two neighboring eNB 202 and eNB 203, and a UE 211. In a traditional 3D OTDOA, four eNBs provide three range differences that represent three independent hyperbola equations to solve three parameters: the position (x, y, z) of UE in 3D. Since multiple antennas are the basic requirement in 4G communication system, they can be utilized to estimate the UE information in the elevation domain. Once the elevation angle of departure (AoD) $\alpha$ is estimated, then the third parameter z can be deduced from x, y, and $\alpha$. As a result, there is no need for the $4^{th}$ eNB with the help of TX beamforming.

In the example of FIG. 2, only three eNBs are needed, one serving base station eNodeB 201 and two neighboring base stations eNodeB 202 and eNodeB 203. The coordinates of the three eNBs are $(x_1, y_1, z_1)$, $(x_2, y_2, z_2)$, and $(x_3, y_3, z_3)$, respectively, and the distance from UE 211 to the three eNBs are represented by $d_1$, $d_2$, and $d_3$, respectively. The three eNBs provide two range differences (e.g., $d_1-d_2$ and $d_1-d_3$) that represent two independent hyperbola equations based on the TDOA measurements. In addition, serving eNB 201 is equipped with antenna array 221 for TX beamforming. By estimating the line-of-sight (LOS) path from the serving eNB, the angle of departure AoD $\alpha$ can be estimated accordingly. As a result, the three unknown parameters (x, y, z) can be reduced to two unknown parameters x and y, which can be solved by two independent hyperbola equations from the two range differences based on the TDOA measurements. The relationship between the vertical coordinate z and the other two coordinates x, y, and AoD $\alpha$ can be represented as:

$$z - z_1 = \tan(\alpha)\sqrt{(x-x_1)^2 + (y-y_1)^2}$$

Figure 3:
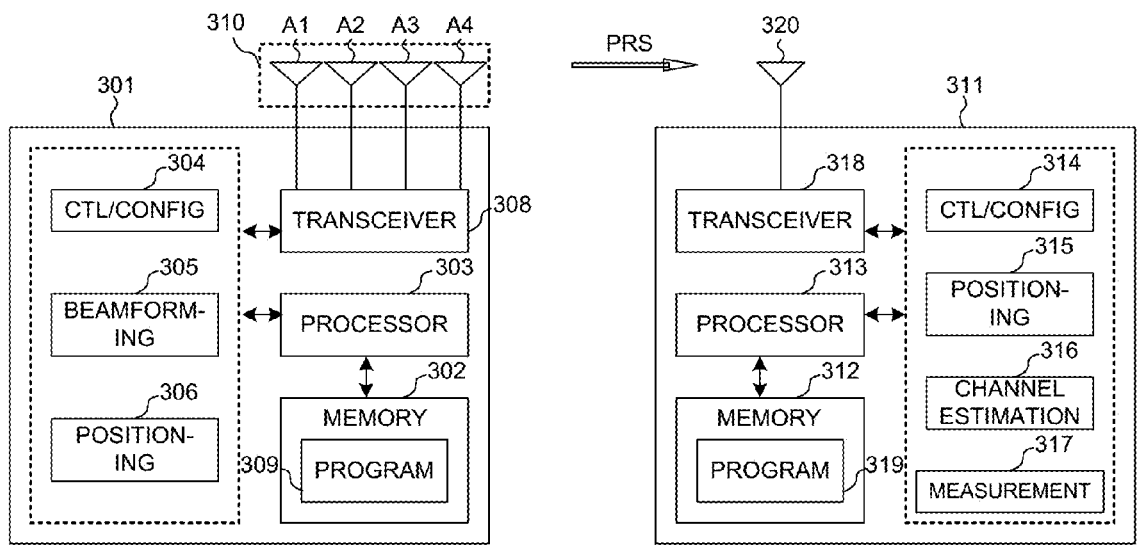
FIG. 3 is a simplified block diagram of a user equipment and a base station that carry out certain embodiments of the present invention.

FIG. 3 is a simplified block diagram of a base station eNB 301 and a user equipment UE 311 that carry out certain embodiments of the present invention. Base station eNB 301 comprises memory 302, a processor 303, a control and configuration module 304, a beamforming module 305, a positioning module 306, and a transceiver 308 coupled to antenna array 310. Similarly, user equipment UE 311 comprises memory 312, a processor 313, a control and configuration module 314, a positioning module 315, a channel estimation module 316, a measurement module 317, and a transceiver 318 coupled to antenna 320. In the example of FIG. 3, eNB 301 is a multi-antenna base station, e.g., antenna 310 comprises multiple antennas A1-A4 for performing TX beamforming. In the transmitting direction, the transceiver converts received baseband signals from the processor to RF signals and sends out to the antenna(s). In the receiving direction, the processor processes the received baseband signals from the transceiver and invoke different functional modules to perform various features and embodiments supported by the wireless devices.

The different modules are functional modules that can be implemented and configured in software, firmware, hardware, or any combination thereof. The function modules, when executed by processors 303 and 313 (via program instructions 309 and 319 contained in memory 302 and 312), interwork with each other to allow the wireless devices to perform enhanced 3D positioning. For example, the beamforming module of the serving eNodeB performs beamforming for transmitting positioning reference signal (PRS) to UE, the measurement module performs radio signal measurements over the received beamformed PRS, the channel estimation module estimates the channel response via the narrowband PRS signal, and the positioning module extracts the LOS path for TOA/TDOA measurements and elevation AoD estimation and finally calculates the UE position. Note that UE position can be calculated at UE side via positioning module 315 if the UE knows the absolute locations of the base stations. Otherwise, UE position can be calculated at eNB side via positioning module 305 if the UE does not know eNB coordinates.

Figure 4A:
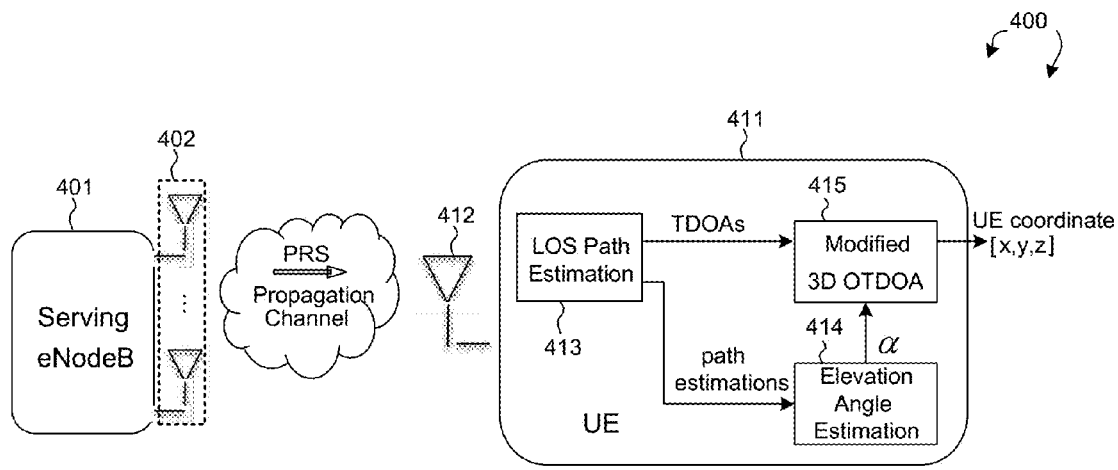
FIG. 4A illustrates one embodiment of a novel 3D OTDOA-based positioning algorithm in a mobile communication network.

FIG. 4A illustrates one embodiment of a novel 3D OTDOA positioning algorithm in a mobile communication network 400. Mobile communication network 400 comprises a serving base station eNB 401 and a plurality of neighbor base stations (not shown), and a user equipment UE 411. For the novel 3D OTDOA positioning, the basic assumptions are: 1) at least three base stations transmit positioning reference signals (PRSs) to the target device UE 411 at the same time instance; 2) the positions of the base stations (e.g., their coordinates) are broadcasted to UE 411 and therefore known by UE 411; 3) the line-of-sight (LOS) path is assumed alive for OTDOA, and UE 411 can estimate the differences of the arrival times of the PRSs transmitted from the base stations, and 4) the serving eNB 401 applies TX beamforming by using antenna array 402 to transmit its PRS to UE 411.

Based on the above assumptions, the 3D OTDOA-based positioning algorithm is performed as follows. First, UE 411 receives the PRSs transmitted from the three base stations via antenna 412. Next, UE 411 estimates the LOS path (e.g., delay index) of the received PRSs for TOA and TDOA measurements via an LOS path estimation module 413. Next, UE 411 extracts the estimated LOS path from the serving eNB for AoD α estimation via an elevation angle estimation module 414. Finally, UE 411 applies a modified 3D OTDOA algorithm to calculate its coordinate [x, y, z] based on the TOA/TDOA measurements and the AoD α via a modified 3D OTDOA module 415. Note that for UE side, the positioning module 315 of FIG. 3 may comprise all three modules 413, 414, and 415.

Figure 4B:
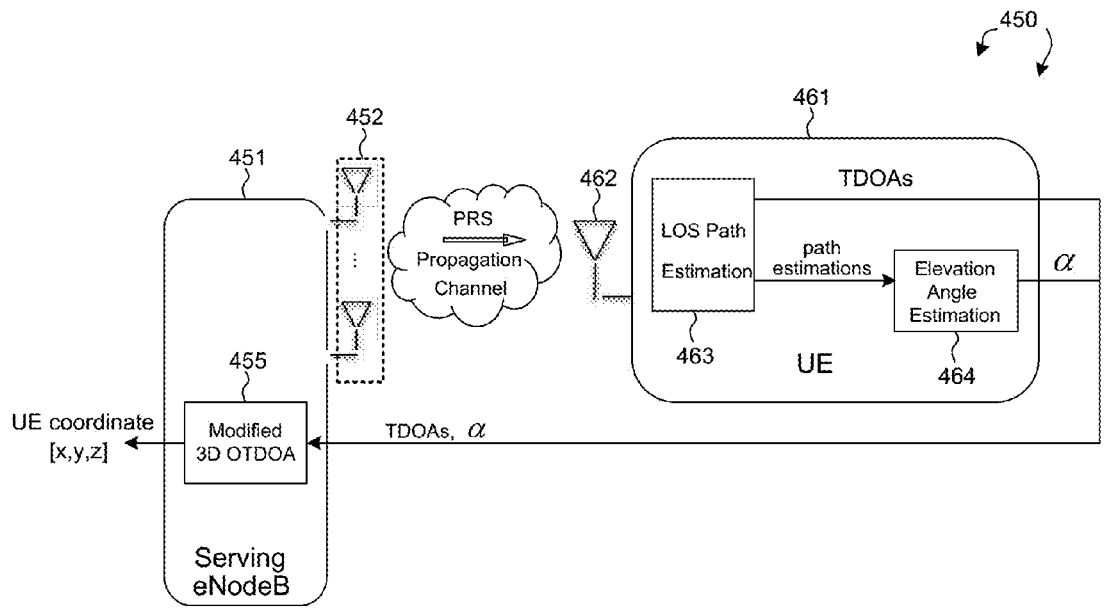
FIG. 4B illustrates another embodiment of a novel 3D OTDOA-based positioning algorithm in a mobile communication network.

FIG. 4B illustrates another embodiment of a novel 3D OTDOA-based positioning algorithm in a mobile communication network 450. Mobile communication network 450 comprises a serving base station eNB 451 and a plurality of neighbor base stations (not shown), and a user equipment UE 461. Network 450 is substantially the same as network 400 illustrated in FIG. 4A. However, in network 450, UE 461 does not know the coordinates of the base stations. UE 461 thus is unable to calculate its own coordinate. The 3D OTDOA positioning algorithm can be modified as follows: UE 461 feedback the TOA/TDOA measurements and AoD α to its serving eNB 451, and eNB 451 calculates the UE coordinate [x, y, z] based on the UE feedback information via a modified OTDOA module 455. Note that for eNB side, the positioning module 305 of FIG. 3 may comprise only the modified 3D OTDOA module 455 for coordinate calculation.

Figure 5:
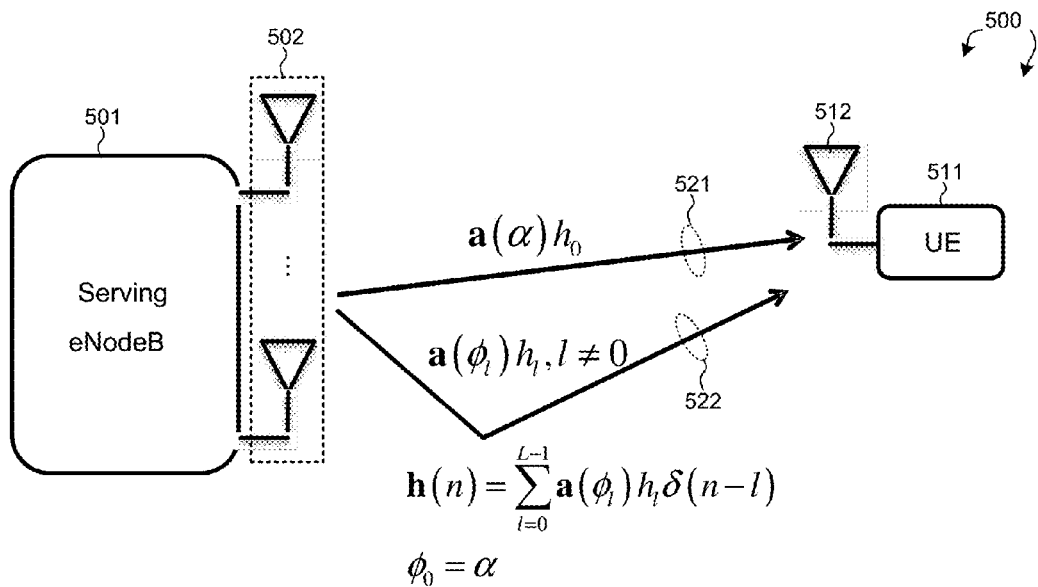
FIG. 5 illustrates the signal model used in 3D OTDOA positioning in a mobile communication network.

FIG. 5 illustrates the signal model used in 3D OTDOA positioning in a mobile communication network 500. Mobile communication network 500 comprises a serving base station eNB 501 having an antenna array 502 and a user equipment UE 511 having an antenna 512. The serving base station eNB 501 and two other neighboring base stations (not shown) transmit PRS to UE 511 at the same time instance. Assume the PRS is a narrowband radio signal and eNB 501 is equipment with an antenna array 502. In OFDM systems, due to multipath propagation, radio signals reaching the receiving antenna by two or more paths. Causes of multipath include atmospheric ducting, ionospheric reflection and refraction, and reflection from water bodies and terrestrial objects such as mountains and buildings. The effects of multipath include interference and phase shifting of the signal. The magnitudes of the signals arriving by the various paths have a distribution known as the Rayleigh distribution, which is known as Rayleigh fading. One component, typically a Line-of-Sight (LOS path) component, arrives first and dominates the distribution as depicted by line 521. Other components (NLOS paths) arrive at later time with fading and are depicted by line 522.

Figure 6:
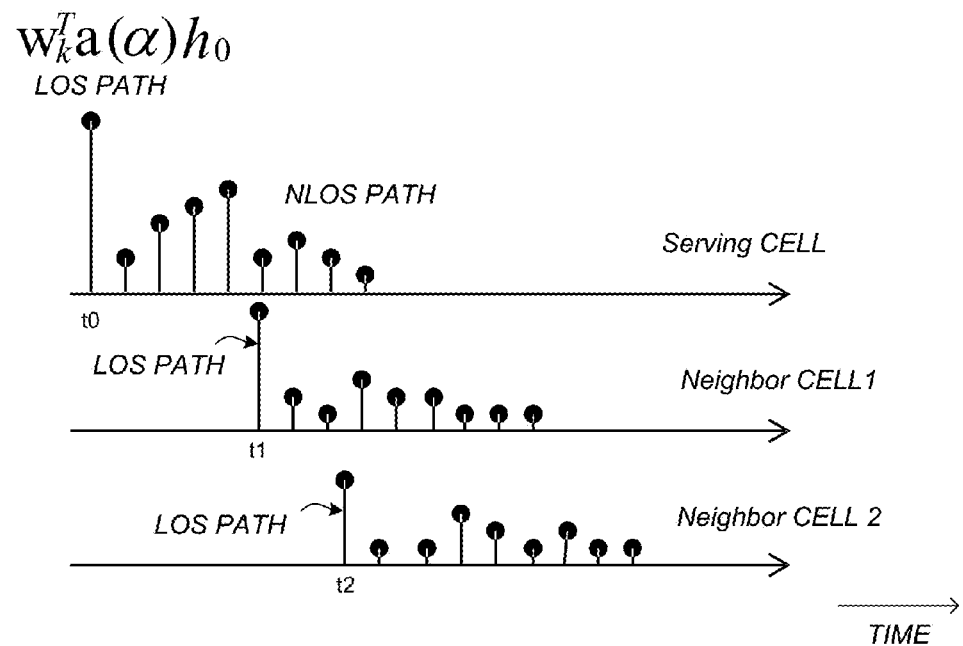
FIG. 6 illustrates different downlink channels from the serving cell, a first neighbor cell and a second neighbor cell.

In the example of FIG. 5, PRS is transmitted from antenna array 502 and received by antenna 512 in the downlink. The downlink channel response h(n) at time instance n from eNB 501 to UE 511 can be represented as follows:

$$h(n) = \sum_{l=0}^{L-1} a(\phi_l) h_l \delta(n-l)$$

$$\phi_0 = \alpha$$

where
L is the number of received impulses equivalent to the number of electromagnetic paths
l is the path index, where l=0 is the LOS path, $h_0$ is the channel for the LOS path, and $\phi_0 = \alpha$ is the angle of departure (AoD) for the LOS path
$\phi_l$ is the angle of departure (AoD) for path l
$a(\phi_l)$ is the antenna response for path l
$a(\alpha)h_0$ represents the magnitude and phase of the received pulse for the LOS path
$a(\phi_l)h_l$, l≠0 represents the magnitude and phase of the received pulse for path l FIG. 6 illustrates different downlink channels from the serving cell, a first neighbor cell 1, and a second neighbor cell 2 to a UE. After channel estimation using PRSs, the LOS path for each downlink channel can be extracted for both TOA/TDOA estimation and elevation AoD estimation. In the example of FIG. 6, the serving base station is equipped with multiple antennas and applies TX beamforming for PRS transmission. As a result, the measured LOS paths with TX beamforming can be represented as:

$$m_k = w_k^T a(\alpha) h_0 + e_k$$

$$a = [1, e^{j\pi \sin \alpha}, \ldots, e^{j(N_t - 1)\pi \sin \alpha}]^T$$

k: measurement index(OFDM symbol index)
$w_k$: beamforming vector on measurement k
$N_t$: Tx antenna number $$m = \begin{bmatrix} m_0 \\ \vdots \\ m_{K-1} \end{bmatrix} = h_0 \begin{bmatrix} w_0^T \\ \vdots \\ w_{K-1}^T \end{bmatrix} a(\alpha) + \begin{bmatrix} e_0 \\ \vdots \\ e_{K-1} \end{bmatrix} = h_0 W a(\alpha) + e, \; e\, N(0, \sigma_e^2 I)$$

The quality of LOS path measurements has large impact on the positioning performance. If the LOS path index is wrong, then the wrong LOS path will be used for the following AoD estimation. Even if the LOS path index is correct, the signal to noise ratio (SNR) of the LOS path measurement is important for AoD estimation. To get better channel estimation and LOS path index, not only path index of the LOS path is estimated, but the whole channel paths and the corresponding indices are estimated jointly. More specifically, "compressive sensing" concept can be applied since the available channel paths are relatively sparse in time domain as compared with the number of reference signals in frequency domain.

Figure 7:
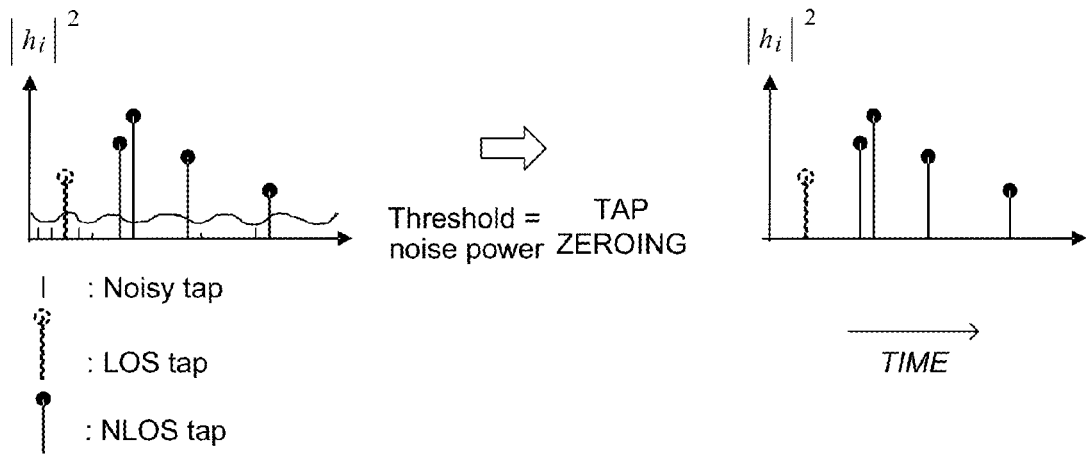
FIG. 7 illustrates one embodiment of LOS path measurement.

FIG. 7 illustrates one embodiment of LOS path measurement. In the example of FIG. 7, the LOS path is the first path of an estimated CIR (channel impulse response). Estimated CIR means channel estimation illustrated in the above paragraph, e.g., "compressive sensing" concept is utilized to estimate CIR. In the estimated CIR, there exist some noisy taps with little power as depicted by the left diagram of FIG. 7. Channel tap zeroing is to zero these noisy taps with a calculated threshold. The threshold is the corresponding noise power. As a result, the first LOS path can be extracted, as depicted by the right diagram of FIG. 7.

More specifically, the noise power estimation and the SNR estimation at frequency domain can be performed based on the following equations:

$$\sigma_e^2 = \frac{\sigma_e^2}{\sigma_h^2 + \sigma_e^2}(\sigma_h^2 + \sigma_e^2) = \frac{1}{1+\rho}\sigma_h^2$$

$$\rho = \sigma_h^2 / \sigma_e^2$$

$$\sigma_{\tilde{h}}^2 = \sigma_h^2 + \sigma_e^2$$

$\sigma_e^2$: noise power on channel estimation
$\sigma_h^2$: channel power
$\sigma_{\tilde{h}}^2$: channel plus noise power
$\rho$: channel to estimation noise power ratio Since the channel to estimation noise power ratio and noise power on channel estimation are both unknown, we have to estimate them by the following method:

$$\hat{\rho} = G \cdot E[\|F\hat{h}_t\|^2]/\sigma_n^2$$

$$\hat{\sigma}_n^2 = E[\|\hat{h}_f - F\hat{h}_t\|^2]$$

$\hat{h}_t$: estimated CIR
F: sampling matrix, constructed from a complete FFT matrix
$\hat{h}_f$: initial channel estimation on PRS
G: SNR gain of subspace pursuit over initial channel estimate After the LOS path measurement, the LOS path index can be used to derive the corresponding TOA measurement for each PRS, which can be used to further derive the TDOA between the PRSs transmitted from the serving base station and the two neighbor base stations. For example, referring back to FIG. 6, time t0, t1, and t2 represent the TOA measurements for the PRSs from the serving cell, the neighbor cell 1, and the neighbor cell 2, respectively. The time differences between t0, t1, and t2 are then used to derive the TDOA measurements. Furthermore, the AoD estimation can be performed based on the LOS path measurement in an LTE OFDM downlink. In LTE, the eNodeBs and UEs communicate with each other by sending and receiving data carried in radio signals according to a predefined radio frame format. Each radio frame contains ten subframes, and each subframe contains eight OFDM symbols. As a result, there are eight measurements in one subframe. The probability density function of the measurement vector m is referred to as p(m). In estimation theory, p(m) sometimes is referred as the likelihood function. If the probability density is Gaussian, this function can be determined by its average, $\mu$, and covariance, $\sigma^2$. Typically, p(m) can be expressed by the following form:

$$p(m) \sim N(h_0 W a, \sigma_e^2 I)$$

To solve the likelihood function, two approaches can be applied. A first approach is the maximum likelihood (ML) solution, and a second approach is the minimum mean square error (MMSE) solution.

ML solution:

$$\hat{\alpha} = \underset{\alpha}{\operatorname{argmax}}\, p(m)$$

MMSE solution:

$$\hat{b} = \left(W^H W + \frac{\sigma_e^2}{\sigma_{h_0}^2} I\right)^{-1} W^H m$$

$$\hat{\alpha} = \sin^{-1}\left(\frac{1}{\pi(N_t - 1)} \sum_{n=1}^{N_t - 1} \operatorname{phase}(\hat{b}_n \hat{b}_{n-1}^*)\right)$$

The beamforming vectors W is distinct and known by the UE in prior in order to solve the equation. In one example, an 8×8 FFT matrix is used and several of its columns are extracted for the case of $N_t \leq M = 8$.

The ML solution can be solved by expectation-maximization (EM) algorithm, which is an efficient algorithm to solve problem with missing variable and achieve the ML solution iteratively. The LOS channel $h_0$ is treated as the missing variable here. The EM algorithm involves E step and M step.

E step:

$$Q(\beta | \beta^l) = E_{h_0}[\ln p(h_0, m | \beta) | m; \beta^l]$$

$$= -\frac{1}{2\sigma_e^2} E_{h_0}[\|m - h_0 W a\|^2 | m; \theta_0^l]$$

$$= -\frac{1}{2\sigma_e^2}[\|m\|^2 - 2\operatorname{Re}(m^H W a E_{h_0}(h_0 | m; \beta^l)) +$$

$$E_{h_0}(|h_0|^2 | m; \beta^l) a^H W^H W a]$$

M step:

$$\beta^{l+1} = \underset{\beta}{\operatorname{argmin}}\, Q(\beta | \beta^l)$$

$$= \underset{\beta}{\operatorname{argmin}}[-2\operatorname{Re}(m^H W a E_{h_0}(h_0 | m; \beta^l)) + E_{h_0}(|h_0|^2 | m; \beta^l) a^H W^H W a]$$

$$E_{h_0}(h_0 | m; \beta^l) =$$

$$\bar{h}_0 + \left(a(\beta^l)^H W^H W a(\beta^l) + \frac{\sigma_e^2}{\sigma_{h_0}^2}\right)^{-1} a(\beta^l)^H W^H (m - \bar{h}_0 W a(\beta^l))$$

$$E_{h_0}(|h_0|^2 | m; \beta^l) \approx E_{h_0}(h_0 | m; \beta^l)^2$$

Referring back to FIG. 2, after both TDOA estimation and AoD estimation, the UE is ready to solve its position $\Theta = [x, y, z]^T$ with two unknown parameters x and y, where z is replaced by x, y, and AoD $\alpha$. For simplicity, iterative least square method is used to achieve the maximum likelihood solution for:

$$\hat{\theta} = \underset{\theta}{\operatorname{argmin}} \|r - d\|^2$$

where
r is the range difference to each base station
d is distance to each base station H is the Jacobian Matrix
k is the iterative index $$r = \begin{bmatrix} \hat{d}_{12} \\ \hat{d}_{13} \end{bmatrix} = \begin{bmatrix} d_1 - d_2 \\ d_1 - d_3 \end{bmatrix} + n$$

$$d_k = \begin{bmatrix} \sqrt{(x-x_1)^2 + (y-y_1)^2 + (z-z_1)^2} - \sqrt{(x-x_2)^2 + (y-y_2)^2 + (z-z_2)^2} \\ \sqrt{(x-x_1)^2 + (y-y_1)^2 + (z-z_1)^2} - \sqrt{(x-x_3)^2 + (y-y_3)^2 + (z-z_3)^2} \end{bmatrix}$$

$$= \begin{bmatrix} \sqrt{(x-x_1)^2 + (y-y_1)^2 + \left(\tan(\alpha)\sqrt{(x-x_1)^2 + (y-y_1)^2}\right)^2} - \sqrt{(x-x_2)^2 + (y-y_2)^2 + \left(z_1 - z_2 + \tan(\alpha)\sqrt{(x-x_1)^2 + (y-y_1)^2}\right)^2} \\ \sqrt{(x-x_1)^2 + (y-y_1)^2 + \left(\tan(\alpha)\sqrt{(x-x_1)^2 + (y-y_1)^2}\right)^2} - \sqrt{(x-x_3)^2 + (y-y_3)^2 + \left(z_1 - z_3 + \tan(\alpha)\sqrt{(x-x_1)^2 + (y-y_1)^2}\right)^2} \end{bmatrix}$$

$$= \begin{bmatrix} \sqrt{(1+\tan^2(\alpha))((x-x_1)^2 + (y-y_1)^2)} - \sqrt{(x-x_2)^2 + (y-y_2)^2 + \left(z_1 - z_2 + \tan(\alpha)\sqrt{(x-x_1)^2 + (y-y_1)^2}\right)^2} \\ \sqrt{(1+\tan^2(\alpha))((x-x_1)^2 + (y-y_1)^2)} - \sqrt{(x-x_3)^2 + (y-y_3)^2 + \left(z_1 - z_3 + \tan(\alpha)\sqrt{(x-x_1)^2 + (y-y_1)^2}\right)^2} \end{bmatrix}$$

FIG. 8 illustrates the modified 3D OTDOA Jacobian Matrix. The nonlinear function for the position of UE $\Theta = [x, y, z]^T$ can be solved by first order Taylor series expansion, linearize the cost function, and derive the least square solution at each iteration:

$$d_{k+1} \cong d_k + H(\theta_{k+1} - \theta_k)$$

$$J(\theta_{k+1}) \cong \|r - (d_k + H(\theta_{k+1} - \theta_k))\|^2 = \|\tilde{r} - H\theta_{k+1}\|^2$$

$$\theta_{k+1} = (H^T H)^{-1} H^T \tilde{r} = \theta_k + (H^T H)^{-1} H^T (r - d_k)$$

Figure 9:
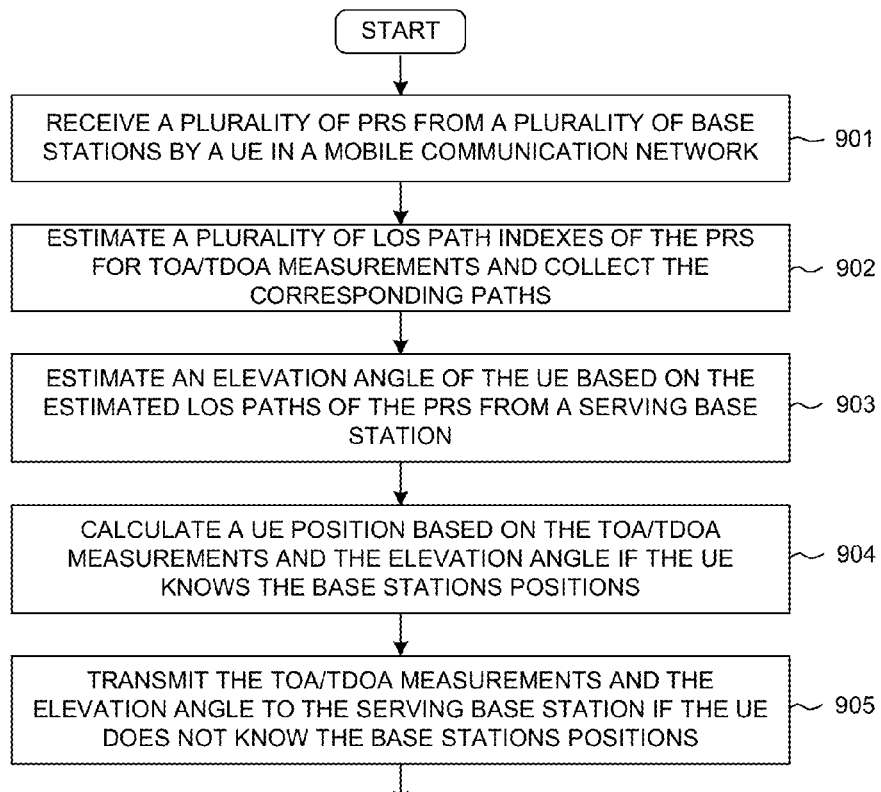
FIG. 9 is a flow chart of a method of performing an accurate 3D positioning algorithm with reduced cost in accordance with one novel aspect.

FIG. 9 is a flow chart of a method of performing an accurate 3D OTDOA-based positioning algorithm with reduced cost in accordance with one novel aspect. In step 901, a user equipment (UE) receives a plurality of positioning reference signals (PRSs) from a plurality of base stations. The base stations include a serving base station and two neighboring base stations. In step 902, the UE estimates a plurality of line-of-sight (LOS) paths and corresponding indexes of the PRSs for time of arrival (TOA) and time difference of arrival (TDOA) measurements. In step 903, the UE estimates an elevation angle of the UE based on the estimated LOS paths of the PRS from the serving base station. In step 904, the UE calculates a UE position based on the TDOA measurements and the elevation angle if the UE knows the coordinates of the plurality of base stations. Otherwise, if the UE does not know the coordinates of the plurality of base stations, then the UE transmits the TOA/TDOA measurements and the elevation angle to the serving base station. The serving base station is then able to calculate the UE position based on the received information accordingly.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a plurality of positioning reference signals (PRSs) from a plurality of base stations by a user equipment (UE) in a mobile communications network, wherein the UE receives a PRS transmission from a serving base station applied with distinct beamforming vectors for multiple OFDM symbols using multiple antennas;
estimating a plurality of line-of-sight (LOS) paths and corresponding indexes of the PRSs for time of arrival (TOA) and time difference of arrival (TDOA) measurements;
estimating an elevation angle of the UE based on the estimated LOS paths of the PRS from the serving base station, wherein the UE estimates the elevation angle based on multiple LOS path measurements that correspond to the multiple OFDM symbols in one subframe;
determining whether the UE knows the plurality of base station positions; and
calculating a UE position based on the TOA/TDOA measurements and the elevation angle when the UE knows the plurality of base stations positions.

2. The method of claim 1, further comprising:
transmitting the TOA/TDOA measurements and the elevation angle to the serving base station when the UE does not know the plurality of base stations positions.

3. The method of claim 1, wherein the plurality of base stations comprises the serving base station and two neighboring base stations.

4. The method of claim 1, wherein the LOS path of the PRS from the serving base station is the first path of an estimated channel impulse response (CIR).

5. The method of claim 1, wherein the LOS path of the PRS from the serving base station is related to the beamforming vector and an antenna response that is associated with the elevation angle of the UE.

6. The method of claim 1, wherein the UE estimates the elevation angle by solving a maximum likelihood function of the multiple LOS path measurements using expectation-maximization.

7. The method of claim 1, wherein the UE position is calculated by solving a 3D UE coordinates of [x, y, z], and wherein the vertical coordinate z is represented by coordinates x and y and the elevation angle with respect to the serving base station position.

8. The method of claim 7, wherein the calculation involves solving a maximum likelihood function of the UE position.

9. A user equipment (UE), comprising:
a radio frequency (RF) receiver that receives a plurality of positioning reference signals (PRSs) transmitted from a plurality of base stations in a mobile communications network, wherein the UE receives a PRS transmission from a serving base station applied with distinct beamforming vectors for multiple OFDM symbols using multiple antennas;
a channel estimation circuit that estimates a plurality of line-of-sight (LOS) paths and corresponding indexes of the PRSs for time of arrival (TOA) and time difference of arrival (TDOA) measurements;
an elevation angle estimation circuit that estimates an elevation angle of the UE based on the estimated LOS paths of the PRS from a serving base station, wherein the UE estimates the elevation angle based on multiple LOS path measurements that correspond to the multiple OFDM symbols in one subframe; and
a positioning circuit that calculates a UE position based on the TOA/TDOA measurements and the elevation angle if the UE knows positions of the base stations.

10. The UE of claim 9, further comprising:
a transmitter that transmits the TOA/TDOA measurements and the elevation angle to the serving base station if the UE does not know the plurality of base stations positions.

11. The UE of claim 9, wherein the plurality of base stations comprises the serving base station and two neighboring base stations.

12. The UE of claim 9, wherein the LOS path of the PRS from the serving base station is the first path of an estimated channel impulse response (CIR).

13. The UE of claim 9, wherein the LOS path of the PRS from the serving base station is related to the beamforming vector and an antenna response that is associated with the elevation angle of the UE.

14. The UE of claim 9, wherein the UE estimates the elevation angle by solving a maximum likelihood function of the multiple LOS path measurements using expectation-maximization.

15. The UE of claim 9, wherein the UE position is calculated by solving a 3D UE coordinates of [x, y, z], and wherein the vertical coordinate z is represented by coordinates x and y and the elevation angle with respect to the serving base station position.

16. The UE of claim 15, wherein the calculation involves solving a maximum likelihood function of the UE position.

* * * * *